(12) United States Patent
Frantz et al.

(10) Patent No.: US 7,885,193 B2
(45) Date of Patent: Feb. 8, 2011

(54) METHOD FOR AUGMENTING A NETWORK

(75) Inventors: Michael Frantz, Munich (DE);
Alexandre Ribeiro, Alverca (PT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 322 days.

(21) Appl. No.: 11/992,282

(22) PCT Filed: Aug. 23, 2006

(86) PCT No.: PCT/EP2006/008248

§ 371 (c)(1),
(2), (4) Date: Mar. 19, 2008

(87) PCT Pub. No.: WO2007/039022

PCT Pub. Date: Apr. 12, 2007

(65) Prior Publication Data

US 2009/0175202 A1 Jul. 9, 2009

(30) Foreign Application Priority Data

Sep. 23, 2005 (EP) .................................. 05020776

(51) Int. Cl.
*H04L 12/26* (2006.01)
*H04L 12/28* (2006.01)
(52) U.S. Cl. ....................................... 370/238; 370/256
(58) Field of Classification Search ........................ None
See application file for complete search history.

(56) References Cited

U.S. PATENT DOCUMENTS

| | | | | |
|---|---|---|---|---|
| 6,564,258 B1 * | 5/2003 | Uniacke | ..................... | 709/223 |
| 6,801,506 B1 * | 10/2004 | Dey | ............................ | 370/256 |
| 6,870,812 B1 * | 3/2005 | Kloth et al. | .................. | 370/235 |
| 7,177,946 B1 * | 2/2007 | Kaluve et al. | ............... | 709/242 |
| 7,283,476 B2 * | 10/2007 | Bare | .......................... | 370/236 |
| 7,599,284 B1 * | 10/2009 | Di Benedetto et al. | ...... | 370/216 |
| 7,613,122 B2 * | 11/2009 | Nishimura | .................. | 370/238 |
| 7,706,258 B2 * | 4/2010 | Elie-Dit-Cosaque et al. | .......................... | 370/224 |
| 2002/0147800 A1 * | 10/2002 | Gai et al. | ..................... | 709/221 |
| 2003/0048746 A1 | 3/2003 | Guess et al. | | |
| 2003/0169694 A1 * | 9/2003 | Seaman | ....................... | 370/254 |
| 2004/0047300 A1 * | 3/2004 | Enomoto et al. | ............ | 370/256 |
| 2005/0088965 A1 * | 4/2005 | Atlas et al. | .................. | 370/216 |
| 2005/0149625 A1 * | 7/2005 | Rouyer et al. | ............... | 709/220 |

(Continued)

*Primary Examiner*—Ayaz R Sheikh
*Assistant Examiner*—Timothy J Weidner
(74) *Attorney, Agent, or Firm*—Laurence A. Greenberg; Werner H. Stemer; Ralph E. Locher

(57) ABSTRACT

To augment a network by adding a network element, network services affected by the augmentation, and a temporary route for transmitting network services determined as affected by the augmentation via the temporary route are determined. A new route through the augmented network, and a spanning tree corresponding to the new route are determined. Memberships of a virtual local area network (VLAN) in ports of network elements of the temporary route are configured. Cost factors at these ports are changed such as to direct the network services determined as affected by the augmentation through the temporary route. A VLAN membership is calculated for each port in the new route for a network service that passes through the augmented network. The new route through the augmented network is re-calculated based on the spanning tree, and VLAN memberships in the ports of network elements which are no longer needed are deleted.

10 Claims, 6 Drawing Sheets

U.S. PATENT DOCUMENTS

Figure 1A:
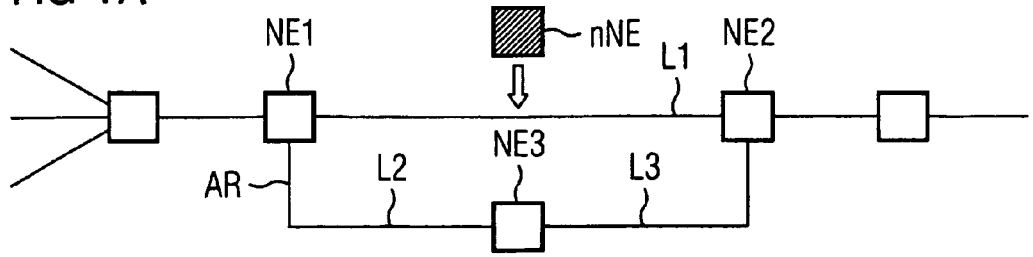
Figure 1B:
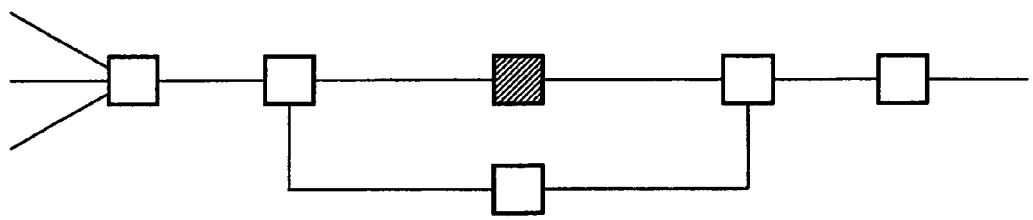
Figure 2A:
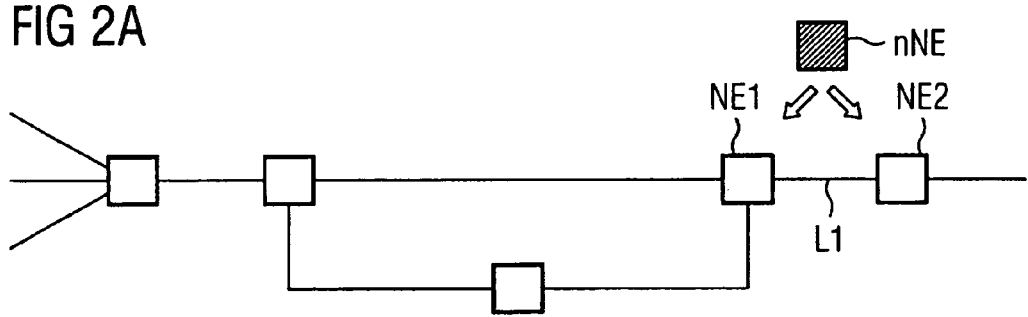
Figure 2B:
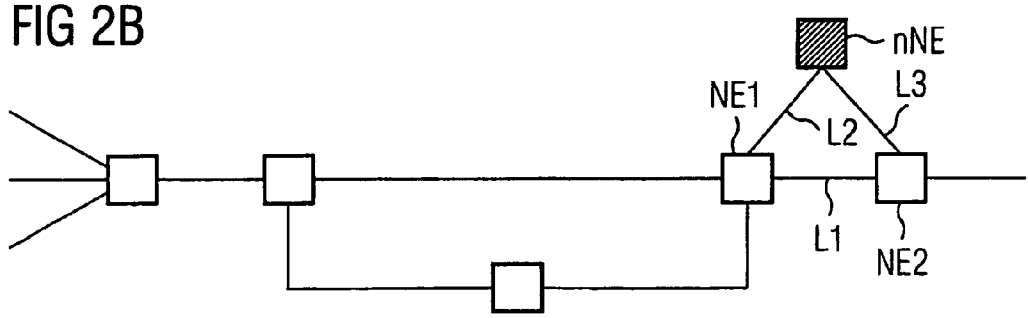
Figure 3:
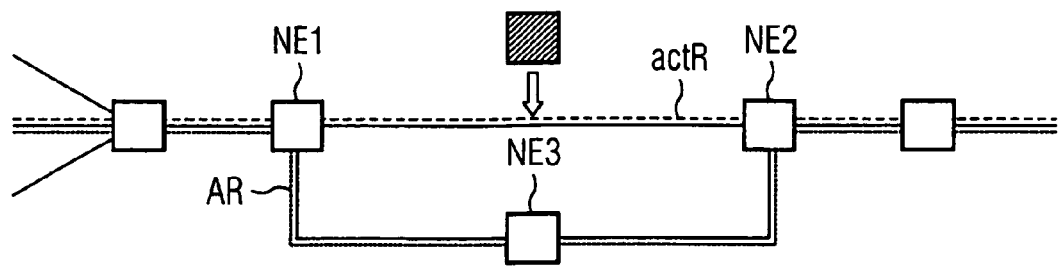
Figure 4:
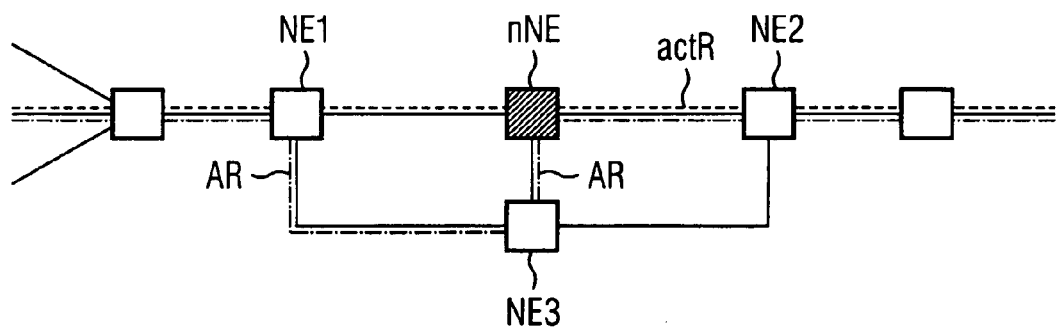
Figure 5:
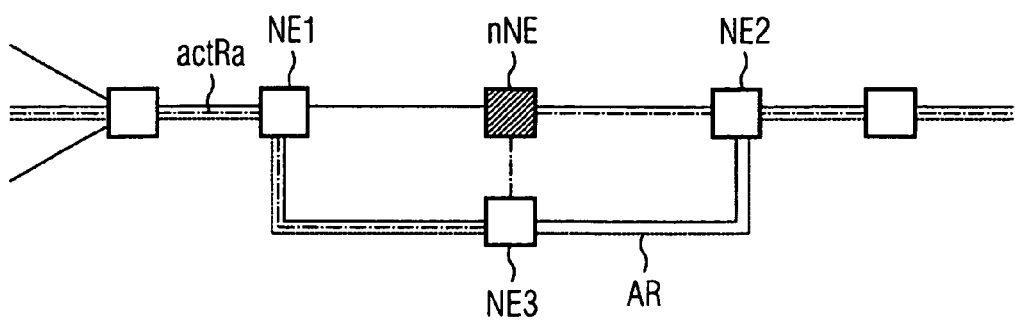
Figure 6:
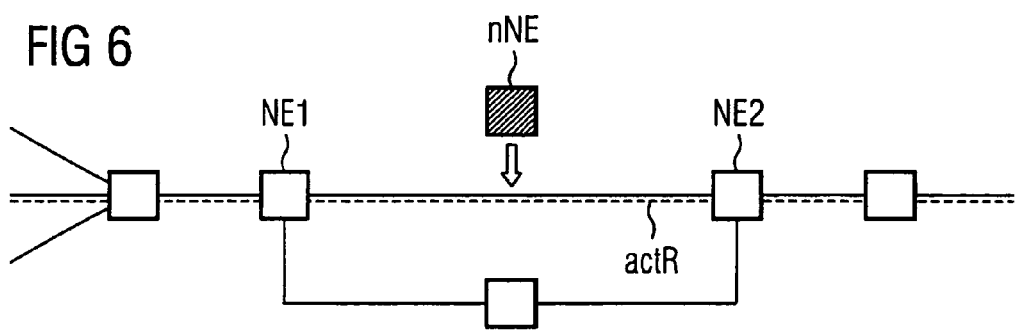
Figure 7:
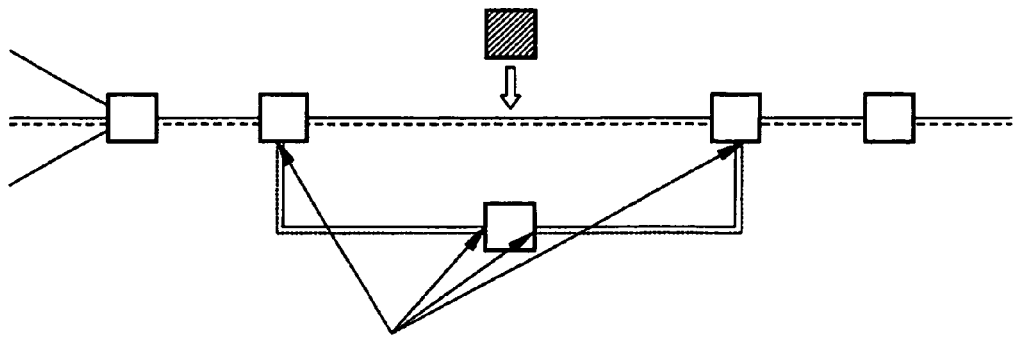
Figure 8:
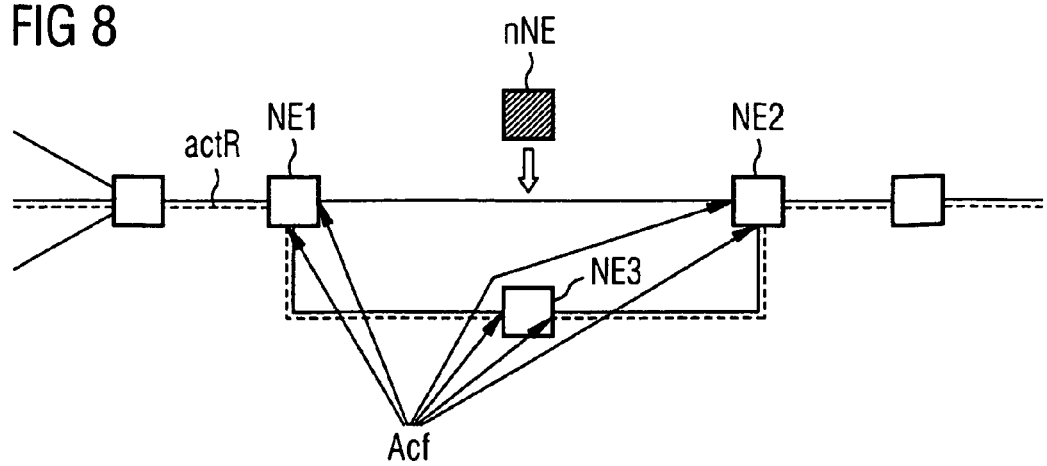
Figure 9A:
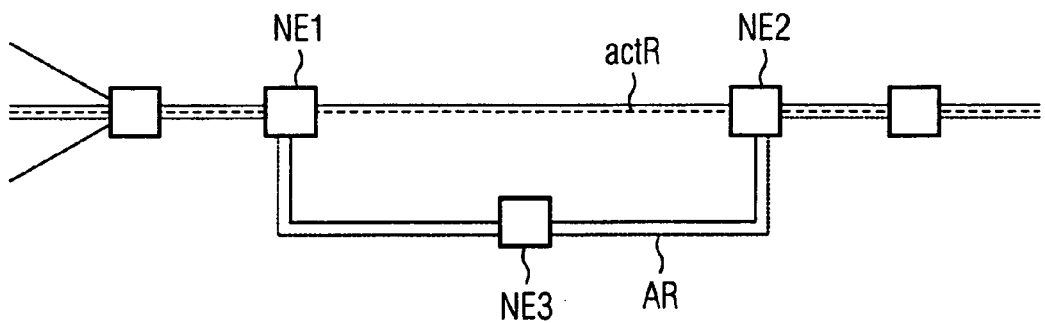
Figure 9B:
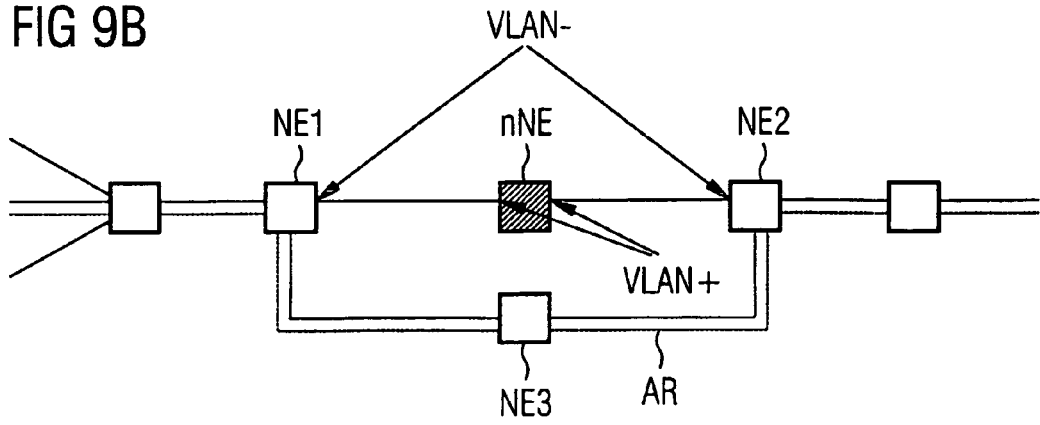
Figure 10A:
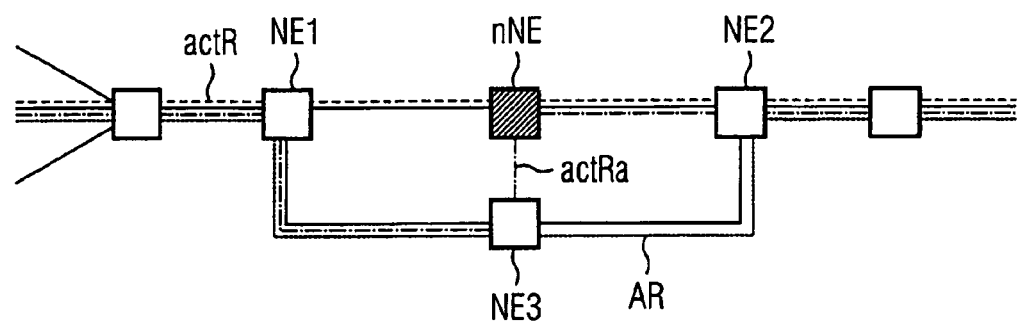
Figure 10B:
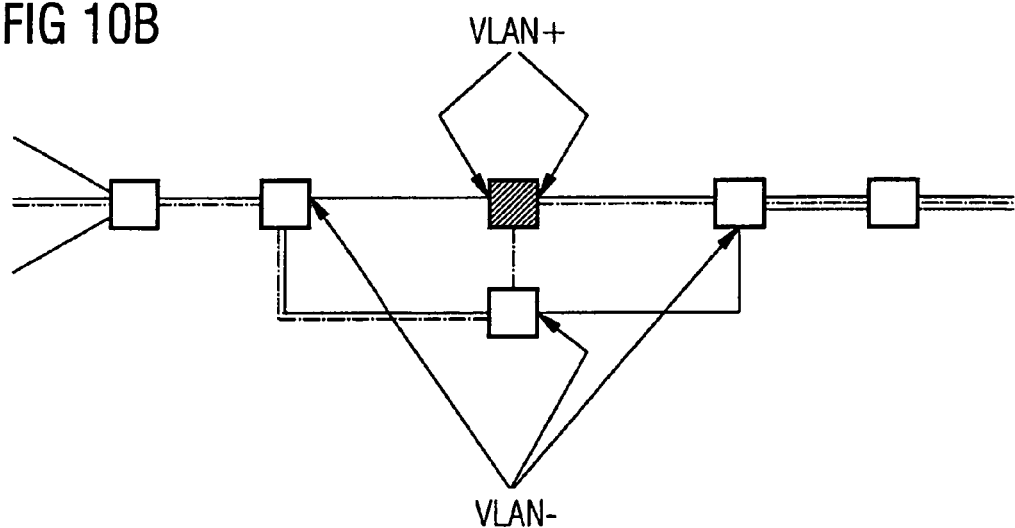
Figure 11A:
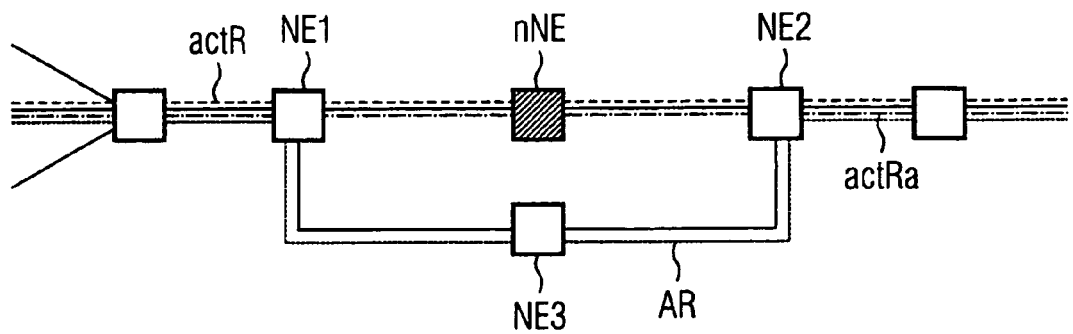
Figure 11B:
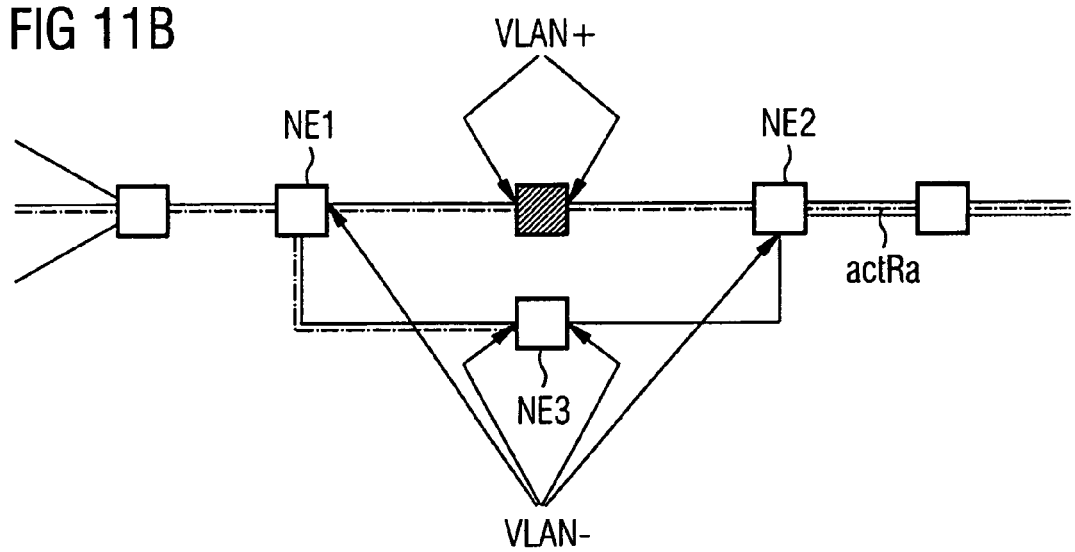

2005/0180339 A1 8/2005 Guess et al.
2005/0259597 A1* 11/2005 Benedetto et al. ........... 370/254
2006/0209677 A1* 9/2006 McGee et al. ............... 370/216

* cited by examiner

METHOD FOR AUGMENTING A NETWORK

A method for augmenting a telecommunications network, in particular an Ethernet network, is described.

Similar to SDH (Synchronous Digital Hierarchy) and ATM (Asynchronous Transfer Mode) Networks, high service reliability is also desired for Carrier Grade Ethernet Networks. For this, the capacity of the Ethernet network is managed in a management system to avoid overbooking for services with guaranteed traffic. Each service has a bandwidth, and one or several dedicated routes may be assigned for the service. The several dedicated routes may include one active route and optional n protective routes. The protected routes are enabled in the case where the active route is disrupted. The management system ensures that the capacities of the network resources used for services with a Class of Service "CoS", which indicates a certain amount of guaranteed bandwidth, are not overbooked.

In many cases it may be necessary to add a network element to an existing network, a procedure called network augmentation. This can lead to traffic disruption, since the new network element might change the network's topology and therefore break the connectivity to already established services. Thus, a network may suffer prolonged downtime.

A "service" is understood to be an object in a management system, which realises a service for a subscriber. Correspondingly, a service can represent a means for implementing an offer made by a provider to a subscriber. Each service with a CoS with guaranteed bandwidth is assigned the bandwidth required for the desired data transmission. Examples of services would include be VoIP (Voice over IP), Streaming Video or Video on Demand.

A "network resource" is understood to be a means for transmitting data across a network. A network resource would thus include network elements and links.

An example of a "network element" is a network card or a workstation. A "link" is understood to be a physical or logical connection between 2 ports of the same or different network elements.

A "route" is a path for data transmission that includes at least one link and connects one network element to another.

An "active route" is considered to be a route in a network that is not disrupted. It can be the route of the service through a spanning tree, whereby the spanning tree is created by switching network elements together according to STP, the Spanning Tree Protocol. This is a protocol which enables rerouting of network traffic when a link is disrupted or a network element is defective.

One goal to be achieved lies in finding a method whereby a telecommunications network is not disrupted or at least minimally disrupted when being augmented.

One method for augmenting a telecommunications network which achieves this goal lies in:
preparing the augmentation by:
  determining the services which would be interrupted due to the addition of a network element to a current network,
  determining a temporary route around the at least one affected service,
  defining a new route by identifying the ports of at least one new network element to be added to the current network and by identifying the ports of the network elements to be connected to the new network element,
physically augmenting the network by:
  enabling the temporary route,
  adding the new network element physically to the current network, thus creating a physically augmented network,
  disabling the temporary route,
  enabling the new route.

The method has the advantage in that a service can be rapidly reconfigured when an existing network is augmented by a new network element, thus saving time, work and cost and reducing the downtime of a network during the physical augmentation process. Traffic interruption can be reduced at least to the time period required by a re-rerouting program re-route the traffic, in particular one based on STP.

It is preferred that the ports of the new network element and the ports of the network elements connected to the new network element, which during the augmentation were disrupted, are given VLAN assignments.

A "VLAN" is a Virtual Local Area Network and includes a logical connection of a plurality network elements connected by links. A VLAN may be assigned a specific network address, such as a MAC (Media Access Control) Address. The ports of network elements may be assigned to one or more VLANs, thus enabling traffic to be directed to certain VLANs within a network.

It is preferred that the physical addition of the new network element is detected electronically. Thus, a reconfiguration of the resources affected by the augmentation can be triggered by electronic notifications for an element manager.

If the new route is determined with the use of the Spanning Tree Protocol, the advantage arises that manually searching through a usually complex network for an alternative route is not necessary.

In a preferred variation of the method, the temporary route may be chosen to be an alternative route in a network. This may be an alternative route in a protected network. The temporary route is preferably enabled at the latest when the augmentation process is physically being carried out, and preferably disabled after the newly introduced network elements have been given network addresses, which may comprise VLAN assignments.

In yet another preferred extension of the method, a network is used for the augmentation which includes an Ethernet Network.

The described methods are further explained by means of the following examples and drawings, whereby:

Drawings 1a, 1b show a network in an augmentation process whereby a new network element is inserted between two existing ones, Drawings 2a, 2b show how two existing network elements are connected with an additional new network element, Drawing 3 shows a network in which an alternative route is found around an existing route, Drawing 4 shows an alternative route determined for an augmented network topology, Drawing 5 shows protecting routes added to the network by means of configuring of a VLAN in the additional ports of the alternate routes.

Drawing 6 shows a current network topology with an active route,

Drawing 7 shows a current network topology, whereby ports of network elements are given new assignments, Drawing 8 shows a current network topology with an activated alternative route, whereby cost factors have been changed, Drawing 9a shows a current network topology when an active route determined by a spanning tree and an alternative route, Drawing 9b shows an augmented network topology in which VLAN assignments of ports not part of a new route are deleted, Drawing 10a shows a current network topology in which an active route determined by a spanning tree, an alternative route and a projected active route for an augmented network, Drawing 10b shows an augmented network topology in which VLAN assignments are added in ports of the new resources and deleted in ports which are not part of the new route, Drawing 11a shows a current network topology with an active route, an alternate route and a projected active route in an augmented network Drawing 11b shows an augmented network topology in which VLAN assignments are added in ports of the new resources and deleted in ports which are not part of the new route, Referring to Drawings 1a and 1b, a new network element nNE is inserted into a link L1 that is assigned to transmit traffic and may be transmitting traffic. In this case, the link L1 between the two network elements NE1 and NE2 must be deleted, and two new links may be created, which connect the new network element nNE to the formerly connected network elements. These two new links L2 and L3 create an alternative route AR. During the time the old link L1 is removed and the new network element nNE is installed and configured, the services transmitted via the old link which was removed will be interrupted until all services are reconfigured for the augmented network topology which includes the new network element nNE. Drawing 1b shows the state where the new network element has been inserted into a path between network elements NE1 and NE2.

Referring to Drawings 2a and 2b, a new network element nNE is added with two new links L2 and L3, connecting it to two already present network elements NE1 and NE2. In this example, no existing links, such as the link L1 connecting network elements NE1 and NE2, are directly affected by the addition of the new network element nNE since a programmed device or an operator is merely creating new links L2 and L3. However, when STP is applied, a previously existing link, such as the link L1, may be disabled, causing services that pass through it to be interrupted until all affected services are reconfigured for the augmented network topology with the added new network element nNE.

It is possible to prevent a disruption of a network during augmentation by carrying out the following method:
1. Determine which services will be affected by the network augmentation. This can be achieved by keeping a database on a network management system that stores all the services that the operator configured in its database. Thus, when a link is changed by a network augmentation operation, the affected services may be determined merely by checking the database to see which services pass through the affected link(s). The network augmentation effects on the network can be predicted or simulated with a testing device, on which an appropriate program can be mounted.
2. If the service is unprotected, i.e., if it does not have an alternative route such as the one designated by AR in Drawing 1, then determine new alternative routes in the current network. This involves determining the route of the spanning tree if the network resources which are affected by the augmentation are not available.
3. Determine the alternative routes in the augmented network for all services identified in step 1. This involves determining the route of the spanning tree if the network resources are available. The calculation of the spanning trees in this step and in step 2 may require detailed knowledge of all cost factors configured in the network. A cost factor may, for example, include bandwidth reservations for the links in the network.
4. Add a desired VLAN membership to all ports for both alternative routes, i.e., for the alternative routes before and after augmentation, for all services. If the service already has alternative routes, this step need be carried out only for the augmented network.
5. Store all services which have been modified for later adoption.

After the network has been augmented, the new route for the spanning tree must be evaluated. Then the effects on the services modified are preferably be analysed, after which all alternative routes may be deleted.

Although this process is thorough, it may be time consuming, in particular for complex networks.

Thus, an augmentation procedure as follows is preferred.

A network is first prepared, so that services will not be or will only minimally be affected when the augmentation procedure begins.

For the preparation, an operator or a programmed device enters the concerned network resources in the existing network topology and defines the augmented network topology with the resources. This state of augmentation can be considered to be a planned, as opposed to a physical, state. More specifically, planned network elements, links, cards or cost factors are added into the network topology. It is at this stage possible to either augment the network based on the spanning tree which is defined by the current cost factors or reconfigure the spanning tree, that is, to change the cost factors.

After the existing (current) topology has been augmented with the so-called planned elements, the following steps can be executed by a system governing the augmentation operation, such as a programmed product controlling a computer device or a controlling circuit, to prepare the network augmentation in dependence on the spanning tree which is chosen as suitable.

If the augmentation is to be performed based on the current cost factors configured in the network, protection of the network, that is, prevention of traffic loss, is preferably achieved according to the following method:
A1). The services which would be interrupted for a special network augmentation scenario are determined by the system. The found services can be assigned to a network augmentation process and given labels defined by the program or operator.
A2). Should the service not have protection, i.e. no alternative routes had already been calculated and provisioned, new alternative routes of the service for the current network topology are determined. These alternative routes can be dependent on the current spanning tree for the network resources which will not be available during the augmentation process for all services that have been identified as being affected by the augmentation process. The network at this stage is not augmented yet.
A3). Determining an alternative route for the augmented network topology and the augmented spanning tree (augmented network) for the services that have been identified as being affected by the augmentation process.
A4). For the services that have been identified as being affected by the augmentation process, the alternative, protecting routes, which in steps b). and c). could be the same, are added by the configuration of a VLAN in the additional ports of the alternative routes.

Drawing 3 shows step A2 graphically. The dashed line in the drawing shows an active route actR passing through a nominal, undisrupted path in a current network topology. The dotted line shows an alternative route AR in the current network, which was determined as the network had no protected route. The alternative route AR is dependent on a spanning tree protocol which is suitable for finding alternative routes by switching the appropriate network elements in a network.

Drawing 4 shows step A3 graphically. The dashed line in the drawing represents the active route actR in the augmented network topology whereas the dashed/dotted lined shows the alternative route AR in the augmented network. Due to the addition of the new network element nNE, an alternative route now passes through the added network element nNE. Thus, the number of network elements through which the data passes from network elements NE1 and NE2, formerly only the one network element NE3, has now been increased to two, as the data now passed through network elements NE3 and nNE.

Drawing 5 shows step A4 graphically. Here, VLAN assignments have been given to all additional ports of the network elements NE1, NE2 and NE3. Thus, additional ports comprise all ports of the newly added network element and the ports of the old network elements that are newly connected to the new network element. The dashed/dotted line represents the projected active route actRa in the augmented network and the dotted line the alternative route AR in the current network.

If, however, the augmentation is to be performed based on changed cost factors in the network, the network traffic is re-routed to ensure service ability. Whereas in the case where no changes are made or required it is possible to differentiate between the services which shall not be affected by the network augmentation based on the traffic class, according this method all services are handled equally. The augmentation is performed as follows:

B1). The services which would be interrupted for a particular network augmentation scenario are determined by the system. The found services can be assigned to a network augmentation process, whose label is definable by the program or operator.

B2). The system determines a different route as well as the corresponding cost factors to enable that all traffic traversing the network resources affected by the network augmentation scenario is transmitted via a different route. If an MSTI (Multiple Spanning Tree Instance) is present in the network, a plurality of different routes as well as the corresponding cost factors are determined by the system is determined to enable that all traffic as above is in this case transmitted via a plurality of different routes.

B3). The route(s) of the augmented topology and the augmented spanning tree for the services identified in Step B1 is determined. This route may be the same as the one found in step B2.

B4). For the services found in step B1, the new routes, which could be the same as the ones in steps B2 and B3, are added by the configuration of VLAN in the additional ports of the new routes.

B5). The cost factor is changed in the network according the results of step B2. With this, all the traffic traversing the network resources affected by the network augmentation are automatically re-routed. As a result, no traffic is transmitted via the network resources which are affected by the network augmentation.

Drawing 6 can be referred to step B1 and shows the basic situation where a current network topology with an active route actR, indicated by the dashed line, connecting at least network elements NE1 and NE2, is about to be augmented. The service which would be interrupted by an augmentation is a service that runs through network elements NE1 and NE2. This service can be labelled for later retrieval after the physical augmentation has carried out.

Drawing 7 may be referred to step B4 and shows a current network topology in which VLAN assignments are added to the ports of the new resources of an augmented network, i.e. those resources which will connect the links of a new route in the augmented network. The dashed line indicates an active route and the dotted line a new route, which however is not yet configured in the new network.

Drawing 8 shows step B5 graphically, whereby a current network topology is presented. The active route is indicated by the dashed line and is reconfigured to pass through network element NE3. The arrows pointing to the ports of the network elements NE1 to NE3 indicate a change in cost factors of $\Delta cf$ brought about by the change in route.

After the preparatory stage as described, the network may be augmented by the programmed device or operator. The network may be altered physically by replacing a network element or adding another network element to the existing topology. For example, a network card could be automatically replaced or inserted into a network with the help of a machine. Physical modifications to the network may however not be visible to the network management system.

When the network topology has been physically changed, the new or deleted network resource can be entered, for example by adding or deleting new network elements or links. The system is alternatively programmed to electronically detect the changes that have been made to the network due to object creation or deletion. This may the new case when a network card has been added or removed. The system may analyse notifications from the element managers to ascertain which changed occurred in the network.

After the augmented topology is defined in a management system as a preparatory measure, all services identified as being affected by the augmentation can automatically be adopted to the augmented network. For this, the new augmented network topology, as well as the new spanning tree (which defines the new routes, active or protected) are analysed and adopted automatically to the new network topology, preferably including the reconfiguration of the corresponding VLAN settings in the network, for all services concerned by the augmentation process. Thus, the routes of the services are recalculated and, if it is a CoS, its bandwidth allocation along the path. The path recalculation involves the following steps:

Re-determining the service's path based on the new spanning tree.

after re-determination of the service path, the correct VLAN membership is set for each port the service goes through, whereby the following scenarios are distinguished:

a. One of the routes calculated in steps A2 or B2 and the route in step A3 or B3 are identical. In this case, the system deletes the VLANs at the ports of the old routes for the resources which are no longer needed, assuming that the service shall not be protected. If the service is protected, these VLANs remain at the ports to which the routes are connected.

b. The new route equals the route determined in step A3 or B3. In this case the VLANs are deleted at the ports of the old route for the resources which are no longer needed, as well as for the alternative route, which is the route calculated in steps A2 or B2. This assumes, however, that the service will not be protected.

c. The new route equals the old route with the new network resources added. In this case the services are interrupted due to the missing VLAN configuration in the new augmented network resources. To minimise the time for the interruption, it is preferred that the gap is detected, i.e. the missing VLAN configurations, and configures the VLAN membership in the new resources for all services to be adopted.

Drawings 9a and 9b may be referred to step a. as delineated above and show a current network topology and an augmented network topology, respectively. The dashed line shows an active route determined by a spanning tree protocol and the dotted line an alternative route. In Drawing 9b, the arrows pointing to the ports of NE1 and NE2 which are connected with the new network element nNE indicate a deletion of a VLAN assignment (VLAN−), as these ports are not part of the alternative and temporary route AR. Thus, traffic can temporarily only pass through the alternate route which passes through NE3. However, since the new network element will be a member in the augmented state, VLANs are assigned to its ports (VLAN+), so that the new network element will be prepared when the assignment of the ports deleted for NE1 and NE2 is re-introduced.

Drawings 10a and 10b present a current network topology and an augmented network topology and may be referred to step b. The active route actR is indicated by a dashed line. The dotted line indicates an alternative route AR in the not yet augmented network. The dashed/dotted line indicates the active route actRa in the augmented network. It can be seen that the active route in the augmented network passed through network element NE1, then NE3 and then NE2. The alternative route (dotted line), which is temporarily enabled to prevent traffic disruption, avoids taking the path of the current active route AR, which would be disrupted when new network element nNE is added. Drawing 10b shows the deletion and addition of VLAN assignments to the ports of the network elements that are affected by an augmentation. For new network element nNE, VLAN assignments are added to each port (VLAN+). For the old network elements NE1 to NE3, the VLAN assignments in the ports which are not part of the new route are deleted (VLAN−).

Drawings 11a and 11b may be referred to step c. and shows a current and an augmented network topology, respectively. Drawing 11a shows how an active route actR (dashed line) in the augmented network is configured to pass straight through network elements NE1, nNE and NE2. This route corresponds to the old active route. Since the appropriate VLAN configurations are missing, however, the service between NE1 and NE2 via nNE3 will be interrupted. The gap can be detected and the missing VLAN configurations to each of the concerned network elements carried out. This is shown in drawing 11b.

For every determination of a new route, the need for an accompanying, protected route is considered. Thus, the service's alternative routes are re-determined.

The determination of the new VLAN connections includes evaluating the bandwidth requirements for each link. If extensive modifications have been made to a service's path, then new bandwidth reservations are made at new ports, whilst erasing the previous ones. This may be done in several steps for each service:

Identifying the network elements and links which are no longer present in the service due to the changes in the network topology.

Removing all the bandwidth reserved for this service in the previously identified network elements.

Identifying the new network elements and links in the service.

Reserving the necessary bandwidth in the previously identified network elements.

It is preferred that the above steps are performed with pauses in between. This way, a programmed device or an operator may control the augmentation process by confirming the correct execution of each step. Further, between the pauses alternative arguments can be introduced into the process.

LIST OF ABBREVIATIONS

NE1 to NE3 network elements
nNE new network element to be inserted into network
L1 to L3 links
actR active route
AR alternative route
actRa active route in augmented network
ARa alternative route in augmented network
VLAN+ addition of VLAN assignment
VLAN− deletion of VLAN assignment

The invention claimed is:

1. A method for augmenting a telecommunications network by adding a network element to an existing network, comprising:

determining network services affected by the augmenting;

determining a temporary route for transmitting network services determined as affected by the augmenting via the temporary route, wherein the temporary route is an alternative route in the existing network;

determining a new route through the network with the augmenting, wherein the new route is a route in the network with the augmenting;

determining a spanning tree corresponding to the new route for the network services determined as affected by the augmenting;

configuring memberships of a virtual local area network (VLAN) in ports of network elements of the temporary route;

changing cost factors at these ports to direct, based on the changed cost factors, the network services determined as affected by the augmenting through the temporary route;

calculating a VLAN membership for each of a plurality of ports in the new route for a network service that passes through the network with the augmenting;

re-calculating the new route through the network with the augmenting based on the spanning tree determined for the new route; and deleting VLAN memberships in a plurality of ports of network elements which are not part of the new route.

2. The method of claim 1, wherein the new route corresponds to the temporary route.

3. The method of claim 1, wherein the new route corresponds to a route including the added network element.

4. The method of claim 3, wherein a VLAN membership is configured in a plurality of new network resources for the added network element.

5. The method of claim 4, wherein VLAN memberships for ports of the temporary route are deleted.

6. The method of claim 5, wherein a plurality of temporary routes is determined by employing a Multiple Spanning Tree Protocol.

7. The method of claim 1, further comprising adding bandwidth requirements for a plurality of ports of the added network element.

8. The method of claim 1, further comprising calculating alternative routes to the new route.

9. The method of claim 1, wherein the network augmentation is performed in an Ethernet network.

10. The method of claim 1, wherein the network services comprise at least one of Voice over IP, Streaming Video, and Video on Demand.

* * * * *